United States Patent [19]

Russotti

[11] Patent Number: 4,668,502

[45] Date of Patent: May 26, 1987

[54] METHOD OF SYNTHESIS OF GASEOUS GERMANE

[75] Inventor: Robert Russotti, Rumson, N.J.

[73] Assignee: Voltaix, Inc., North Branch, N.J.

[21] Appl. No.: 818,515

[22] Filed: Jan. 13, 1986

[51] Int. Cl.$^4$ ............................................. C01G 17/00
[52] U.S. Cl. ..................................................... 423/645
[58] Field of Search ........................................ 423/645

[56] References Cited

U.S. PATENT DOCUMENTS 3,577,220  5/1971  Kuratomi et al. ................... 423/645

OTHER PUBLICATIONS

Drake, "Chemical Absts.", vol. 56, 1962, #4345(g).
Drake et al., "Journal of Chemical Soc.", 1962, pp. 2807–2813.
Jolly, "Journal of American Chemical Soc.", vol. 83, 1961, pp. 335–337.

Primary Examiner—H. T. Carter
Attorney, Agent, or Firm—Jenner & Block

[57] ABSTRACT

Disclosed is a high yield method for the production of gaseous germane of high purity comprising the steps of: forming an aqueous, alkaline first solution of $GeO_2$ in alkali metal hydroxide wherein the $GeO_2$ is present at a molar concentration of less than 0.2 and the ratio of $GeO_2$ to alkali metal hydroxide is less than 1 to 2; adding an alkalai metal borohydride to the first solution at a mole ratio of $BH_4$ to $GeO_2$ of greater than 4:1; reacting the second solution with 1.5 to 3.0 M $H_2SO_4$ whereby to form a gaseous product containing $GeH_4$; and recovering $GeH_4$ from the gaseous product.

9 Claims, 1 Drawing Figure

METHOD OF SYNTHESIS OF GASEOUS GERMANE

FIELD OF THE INVENTION

The invention disclosed herein relates to an improved method for the production of germane gas.

BACKGROUND OF THE INVENTION

High purity germane gas has found wide use in the semiconductor industry. It is used in the fabrication of a wide variety of semiconductor devices, such as, transistors, diodes, integrated circuits, detectors, photovoltaic devices, and the like.

Despite this wide usage, the methods used to synthesize high purity, gaseous germane have heretofore been characterized by the use of expensive reagents as starting materials or by low yields, or by both. None of the prior art syntheses obtain high yields from relatively inexpensive starting materials.

An early synthesis of germane ($GeH_4$) was the reaction of magnesium germanide with dilute, e.g., hydrochloric acid added drop wise in a hydrogen atmosphere, or with ammonium bromide in liquid ammonia. Yields were low, less than 25%.

More recent synthesis routes utilize either germanium dioxide or germanium tetrachloride. The recent processes are of three types: (1) reduction of the germanium compound dissolved in alkaline media, or (2) reduction of germanium dioxide dissolved or dispersed in acidic media; and (3) reduction of germanium tetrachloride dissolved in tetrahydrofuran.

In the earliest of the modern practice prior art references, T. S. Piper and M. Kent Wilson, "The Preparation of Germane," J. Inorg. Nucl. Chem. 4, 22 (1957) prepared gaseous germane by dissolving germanium oxide in boiling hydrobromic acid. Their yield was 73% germane, of which 0.6% was digermane. T. N. Srivastava, J. E. Griffiths, and M. Onyszchuk, "Derivatives of Monogermane," Can. J. Chem. 40, 739 (1962), used the method of Piper and Wilson, but allowed the reduction to occur at 35° C. instead of at 0° C. They obtained yields of 90-95%. Griffiths, "Monogermanes-Their Synthesis and Properties," Inorg. Chem, 2, 375 (1963), used the same synthesis with a more complicated recovery method to obtain quantitative yields of up to 99.7%, with digermane constituting less than 1%. These references do not postulate an exact mechanism for the reduction reaction.

E. D. Macklen, "Preparation of Germane," J. Chem. Soc., 1989 (1959), added litium aluminum hydride to germanium tetrachloride dissolved in tetrahydrofuran at 35° C. He obtained a 40% yield of monogermane under the best conditions. A side reaction is cited as the cause of the low yield. Formation of a yellow precipitate is mentioned. The proposed mechanism for the reaction is:

L. M. Antipin, "Reactions of Germanium Tetrachloride with Potassium and Sodium Tetrahydroborates," Russ. J. Inorg. Chem., 13, 162 (1968), used a solution of 4.6 grams of germanium tetrachloride dissolved in 30 ml water. To this solution was added drop wise a solution of 6.2 grams potassium tetrahydroboride dissolved in 120 ml water. A yield of 81.5% $GeH_4$ was obtained when base was added at a mole ratio of 15:1. A yield of 96% was obtained using an "excess of borohydride," i.e., a ratio much greater than 15:1.

W. L. Jolly, "The Preparation of the Volatile Hydrides of Groups IV-A and V-A by Means of Aqueous Hydroborate," J. Amer. Chem. Soc., 83, 335 (1961), reported a 68% yield of germdane with around 2% digermane using 2 grams of 85% potassium hydroxide, 1 gram of germanium dioxide and 3.0 grams of potassium borohydride dissolved in that order in 25 cc of water. This solution was added to a 3.6M sullfuric acid solution. Jolly reported a brown germanium containing precipitate forming in the flask. At ratios of borohydride to $GeO_2$ lower than 6:1, he reported enormous amounts of foam resulting from the formation of "soap like molecules" formed when too little reducing agent was present.

J. E. Drake and W. L. Jolly, "Hydrides of Germanium," J. Chem. Soc., 2708 (1962), used an aqueous alkaline solution of germanium dioxide in potassium borohydride. They reported a 73% yield under optimum conditions. Formation of the yellow polymer and vast amounts of foaming occurred when the acid used was hydrochloric acid or sulfuric acid. The 73% yield came from a reaction in acetic acid. Drake and Jolly found that the yield decreased when more than 3:1 borohydride was used.

John E. Drake, "The Preparation of Some Germanium Hydrides," University of California Lawrence Radiation Laboratory Berkeley, Calif., Contract No. -70405-ENG-48 (1961), used the method of Jolly, with an acid concentration of 3.0M, a base concentration of 7.4%, a $GeO_2$ concentration of 0.40M, and a $BH_4$-concentration of 2.21M. In a series of experiments, he obtained yields of approximately 70%. He reported that the best results were obtained with the use of glacial acetic acid. He reported higher yields when polyglycol was added to the product to cut down on the foaming. Drake's postulated reaction for the reduction of the hydrated $GeO_2$ is:

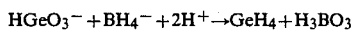

It has been heretofore impossible to obtain consistant yields of over 90% germane without the use of expensive reagents, such as hydrobromic acid or germanium tetrachloride, or unacceptably large amounts of the hydriding agent. Synthesis using relatively inexpensive reagents (germanium dioxide, potassium hydroxide, borohydride, and sulfuric acid used by Jolly, Drake and Jolly, and Drake) report relatively low yields, 70% or less. This inability to obtain high yields of germane by reactions using inexpensive reagents has resulted in high prices for high purity (claimed 99.9%) germane, e.g., of up to $25.00 per gram or more (August 1985 prices).

SUMMARY OF THE INVENTION

According to the invention disclosed herein, there is provided an improved, high yield method for the production of gaseous germane from relatively inexpensive reactants. The herein contemplated method of synthesizing gaseous germane of high purity comprises the steps of: (a) forming an aqueous, alkaline first solution of germanium dioxide in alkali metal hydroxide, wherein the germanium dioxide is present at a molar concentration of less than 0.26 and the ratio of the germanium dioxide to the alkali metal hydroxide is less than 1 to 2; (b) adding an alkali metal borohydride to the first solution at a mole ratio of $BH_4$ to germanium dioxide of greater than 4:1; (c) reacting the second solution with acid, e.g., 1.5 to 3.0M sulfuric acid, whereby to form a gaseous product containing $GeH_4$; (d) recovering the $GeH_4$ from the gaseous product.

The gaseous germane synthesized by this process has a purity of at least 96% monogermane (germanium tetrahydride). Step (c), reacting the second solution with acid, is carried out at ambient temperatures, for example, 19°–40° C. Step (d), recovering germane of high purity, is carried out by recovery methods well known in the art.

In one preferred embodiment of the present method, the reaction between the second solution and the acid is carried out by a batch process. Alternatively, the reaction may be carried out by a continuous process.

In contrast to those prior art methods which have resulted in comparable yields, for example, the method of Srivastava, Griffiths, and Onyszchuk and Griffiths above, the herein contemplated method does not use hydrobromic acid. Hydrobromic acid has the disadvantage of being an expensive reagent, costing about 10 times as much as sulfuric acid. Additionally, the acid, e.g., sulfuric acid, used in the herein contemplated invention does not have to be boiled or fumed, as does the hydrobromic acid used in the prior art processes. Furthermore, the herein contemplated process consumes about 5 times less acid because $GeO_2$ is more soluble in alkaline media than in acidic media. The boiling hydrobromic acid method uses an approximate mole ratio of $BH_4:GeO_2$ of 37:1.

While the prior art methods used by Jolly, Drake and Jolly, and Drake use essentially the same reactants as does the herein contemplated process, the proportions of reactants and the conditions under which those methods are carried out are significantly different and result in much lower yields. These yields barely approach 70%, much lower than the yields of the process of the present invention. Thus, the process of the present invention is unique in its combination of high yields using relatively inexpensive reactants. The method of this invention allows commercial synthesis of relatively inexpensive germane of high purity.

THE DRAWINGS

The invention may be particularly understood by reference to the drawing appended hereto.

FIG. 1 is a flow chart illustrating the method of the present invention.

DETAILED DESCRIPTION OF THE INVENTION

Figure 1:
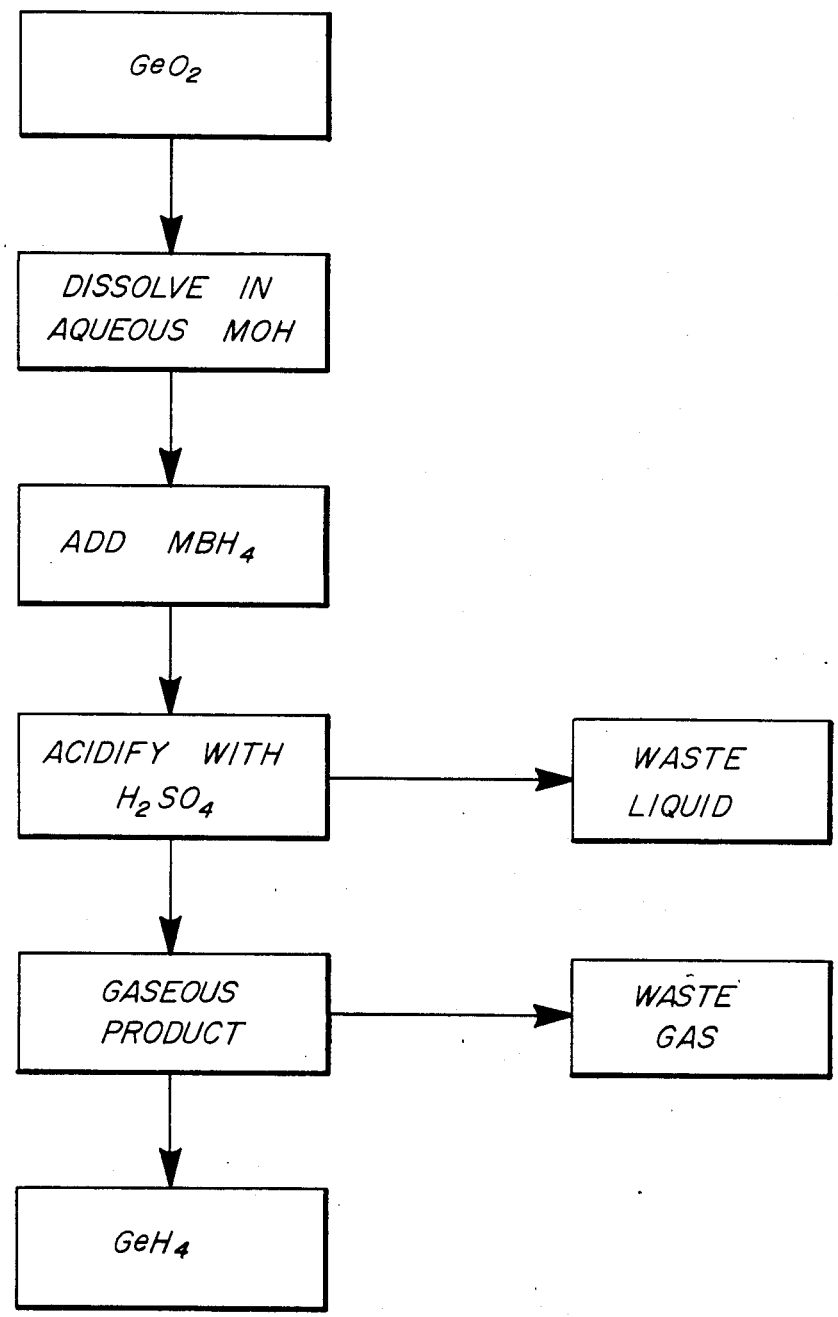

According to the invention described herein, there is provided an improved, high yield method for the production of germane gas from relatively low cost reactants.

FIG. 1 is a flow chart showing a reaction path of the present invention, whereby gaseous germane of high purity is obtained. According to the invention herein contemplated, illustrated in FIG. 1, a quantity of $GeO_2$ is dissolved in an aqueous solution of an alkali metal hydroxide, for example, potassium hydroxide, wherein the $GeO_2$ is present at a molar concentration of less than 0.26 and the ratio of $GeO_2$ to alkali metal hydroxide is less than 1 to 2. Especially preferred is a first solution with germanium dioxide at a concentration in a range of 0.11 to 0.15M, and alkali metal hydroxide at a concentration in a range of 0.3–0.6M. To this solution is added a quantity of alkali metal borohydride, for example, $NaBH_4$, at a mole ratio of $BH_4$ to $GeO_2$ of greater than 4:1. Especially preferred is a second solution at a molar concentration of the borohydride in a range of 0.4–1.05M. The second solution is then reacted with acid, e.g., sulfuric acid of 1.5–3.0 M/liter concentration, whereby a gaseous product containing $GeH_4$ is formed. The gaseous germane containing product is then subjected to refinement processes well known in the art to remove the waste gases and waste liquids, leaving $GeH_4$ of high purity. Germane produced both in the lab and in production runs using the herein disclosed method contains less than 20 ppm each of $H_2O$ and $CO_2$. The lab samples show less than 20 ppm $Ge_2H_8$ and higher germanes, and less than 1 ppb $H_2$. Elemental analysis has shown the presence of other elements to be negligible, e.g., less than 1 ppm each.

More significantly, the method of the present invention produces an as synthesized product of much higher purity than do the methods of the prior art, thereby permitting a simpler, less expensive refinement process. The higher purity of the as synthesized product is due to optimization of the process parameters to near theoretical limits, thereby resulting in minimum side reactions which give undesirable side products. Prior art methods results in the formation of organic contaminants, as well as, for example, hydrochloric acid and chlorine in the as synthesized product. The refinement steps necessary to remove these contaminants each extract a cost in the form lowering yield. Thus, the method of the present invention allows a cleaner as synthesized product which results in better yields at lower cost.

In a preferred embodiment of the present method, the reaction between the second solution and the sulfuric acid is carried out by a batch process. In the contemplated "batch process", second solution is added to a reaction vessel containing the required amount of acid, e.g., at a constant flow rate until the pressure in the system, including reactors and traps, reaches between 700–800 Torr. This generally takes about 4 minutes. The addition of reactants is halted to allow condensation of germane and subsequent pumping out of hydrogen, e.g., for two minutes. The system is lowered to 200 Torr pressure and the addition of the second solution is resumed.

Alternatively, the second solution may be added at a pressure of about 760 Torr of a gas that is substantially non reactive with the reactants, e.g., hydrogen, nitrogen or inert gas. Then, as the reaction progresses, the system is vented to release non-condensible products, maintaining a constant one atmosphere pressure of germane in hydrogen. In this way, reactants are added until the acid is consumed. The spent acid is pumped out. Fresh acid is introduced and the addition is repeated as many times as necessary.

In yet another preferred embodiment, gaseous germane is synthesized in a continuous process. By a "continuous process" is meant a process where the second solution and the acid are continuously mixed within the reaction vessel, and the spent reactants are simultaneously removed. In this manner, as the solutions are spent, they are immediately removed from the reactor as waste and replaced by a continuous stream of fresh reactants. Consequently, the process conditions are substantially the same from start to finish.

In another preferred exemplification, the reaction between the second solution and the acid is carried out at ambient temperatures, for example 19°–40° C. Within this temperature range, high yields of germane are obtained. Outside of this range, however, pronounced adverse effects on yield are noted.

Yields of over 96% germane have consistenly been obtained using the method of the present invention when the critical reaction parameters are optimized. The herein contemplated method uses relatively inexpensive groups of reactants, e.g., $GeO_2$, $NaB_4$, $NaOH$ and $H_2SO_4$, as starting materials. The combination of high yield with lower cost reactants renders the invention disclosed herein uniquely advantageous over the prior art methods for the synthesis of germane gas.

The invention may be understood by reference to the following examples.

EXAMPLES

Table I summarizes the results obtained from a number of sample runs using the method of the present invention, varying the concentrations of the reactants and the conditions under which the reaction was run from sample to sample.

It should be noted that the optimum yield of crude germane was obtained for sample #BR-02-30, RJ-01-84, and RJ-01-86.

Of the prior at references that synthesized germane using $GeO_2$/alkali/$H_2SO_4$/$BH_4^-$ systems, the best results are summarized in Table II below.

The results in lines 3 and 4 were obtained using the method of the present invention, with germane yields of 96 and 97%. These yields are much higher than the optimum yields obtained by Jolly or by Drake. The samples prepared according to the method of the present invention use lower base concentration, lower $GeO_2$ concentration, lower $BH_4$ concentration, and a higher temperature than do those samples prepared by the methods of the prior art. The basis for the improved yield is believed to be attributable to a combination of all these factors.

The concentrations of germanium dioxide, alkali metal hydroxide, and borohydride compound for the present invention samples are lower than those of Jolly, above, and of Drake, a series, above. Furthermore, Drake and Jolly obtained their best results using acetic acid, and concluded that the method employing sulfuric acid was a failure due to the excessive foaming an formation of yellow precipitate.

Jolly and Drake conducted all of their sulfuric acid studies at 0° C., while the samples prepared according to the method of the present invention were prepared at ambient temperatures. The utilization of ambient temperatures by the present method represents a considerable advantage over the 0° C. method of the prior art, improved yield aside, because no expensive refrigeration is needed.

Comparison of the yields contained in Table III indicates the relative insensitivity of the yields to sulfuric acid concentration in the range 3M–18M.

GERMANE SYNTHESIS

| SAMPLE Number | YIELD CRUDE | YIELD DIGERMANE | MOLE RATIO $GeO_2$:$NaBH_4$ | SOL. RATIO $GeO_2$:$H_2SO_4$ | $HSO_4$ CONC. | TEMP. IN C. | $GeO_2$ SOL. CONC. | QUANTITY $GeO_2$ SOL. |
|---|---|---|---|---|---|---|---|---|
| BR-02-30** | 97% | — | 1:6 | 1:2 | 1.5 M | 25 | .13 M | 494 CC (.064) |
| RJ-01-84** | 96% | — | 1:6 | 1.1:1 | 3 M | 25 | .13 M | 445 CC (.058) |
| RJ-01-86** | 96% | — | 1:6 | 1:1 | 3 M | 25 | .13 M | 770 CC (.100) |
| RJ-01-89 | 88.7% | .6% | 1:6 | 1:1 | 3 M | — | .13 M | 1923 CC (.250) |
| RJ-01-91 | 72% | — | 1:6 | 1:1 | 3 M | 25 | .26 M (In NaOH) | 400 CC (.104) |
| RJ-01-92 | 56% | — | 1:6 | 1:1 | 3 M | 0 (Ice bath) | .25 M (In NaOH) | 400 CC (.100) |
| RJ-01-93 | 82.3% | — | 1:6 | 1:1 | 3 M | 20–40 | .13 M | 1000 CC (.130) |
| RJ-01-95 | 89.1% | — | 1:6 | 1:2 | 3 M | 20–30 | .13 M | 1500 CC (.195) |
| BR-02-53 | 86.9% | 20% | 1:7 | 1:1.5 | 3 M | 30–40 (Heated) | .13 M | 1000 CC (.130) |
| RJ-02-10 | 86% | 1.5% | 1:5 | 1:1.5 | 3 M | 19–37 | .13 M | 1000 CC (.130) |
| RJ-02-12 | 80% | 1.95% | 1:4 | 1:1.5 | 3 M | 19–36 | .13 M | 1000 CC (.130) |
| BR-02-60 | 72.3% | 2.4% | 1:4 | 1:2 | 1.5 M | 20–30 | .13 M | 500 CC (.065) |
| RJ-02-23 | 79.8% | 1.2% | 1:4 | 1:2 | 1.5 M | 30–40 (Heated) | .13 M | 1500 CC (.195) |

NOTES:
*$GeO_2$ SOLUTION IN KOH
**YIELD DETERMINED BY ATOMIC ABSORPTION SPECTROSCOPY

TABLE II

Comparison of Prior Art with the Method of the Invention.

| $GeH_4$ | Acid Conc. M | Base Conc. M | $GeO_2$ Conc. M | $BH_4$ Conc. M | Ratio $BH_4$/$GeO_2$ | Temp. °C. | Yield % |
|---|---|---|---|---|---|---|---|
| Jolly | 3.6 | 6.4 | .38 | 2.23 | 5.82 | 0 | 68 |
| Drake a series | 3.0 | 7.4 | .40 | 2.21 | 5.39 | 0 | 70 |
| RJ-01-84 & 86 | 3.0 | 2.8 | .13 | .79 | 6.0 | 25 | 96 |
| BR-02-30 | 1.5 | 2.8 | .13 | .79 | 6.0 | 25 | 97 |

TABLE III

| | Sensitivity of Yield to Changes in Acid Concentration | | | | | | |
|---|---|---|---|---|---|---|---|
| | Acid Conc. M | Base Conc. % | $GeO_2$ Conc. M | $BH_4^-$ Conc. M | Ratio $BH_4^-/GeO_2$ | Temp. °C. | Yield $GeH_4$ % |
| Drake C | 3 | 7.4 | .42 | 1.07 | 2.55 | 0 | 59.1 |
| | 14.4 | 7.4 | .42 | 1.07 | 2.55 | 0 | 59.0 |
| | 18.0 | 7.4 | .41 | 1.05 | 2.55 | 0 | 55.6 |

The data from both Table II and Table III indicate that acid concentration is not critical to obtaining the highest yields under this system. A comparison of sample BR-02-30 with RJ-01-84 and 86 illustrates the insensitivity the present method to acid concentrations in the range of 1.5M to 3M. The acid is used to activate the borohydride since the alkaline solution of borohydride is stable. Thus, only enough acid need be present to insure activation. The use of more concentrated acid is not only wasteful, but poses the problem of sulfur dioxide contamination, a problem noted by Drake. The relatively insensitivity of the yield of the method of the present invention to acid concentration renders large scale preparation of germane more feasible.

Table IV summarizes the effects of varying three factors which are critical to optimizing yields: $GeO_2$ concentration, temperature, and $NaBH_4:GeO_2$ ratio.

TABLE IV

| Temperature versus Yield | | |
|---|---|---|
| | Yield % | Temp. |
| RJ-01-91 | 72 | room temp. (25° C.) |
| RJ-01-92 | 56 | ice bath (0° C.) |

| $GeO_2$ Concentration versus Yield | | |
|---|---|---|
| | Yield % | $GeO_2$ conc. M |
| RJ-01-91 | 72 | .26 |
| RJ-01-89 | 88.7 | .13 |
| RJ-01-95 | 89.1 | .13 |

| Effect of Ratio $NaBH_4:GeO_2$ | | |
|---|---|---|
| | Yield % | Ratio |
| RJ-01-89 | 88.7 | 6:1 |
| RJ-02-10 | 86 | 5:1 |
| RJ-02-12 | 80 | 4:1 |
| BR-02-60 | 72 | 4:1 |

Performing the synthesis at zero degrees C. favors the yield of polymer, seriously reducing germane yield. The optimum temperature conditions appear to be within the range of 19°–40° C.

Increasing $GeO_2$ concentration beyond 0.13M has the consequence of dramatically lowering yield. Above 0.26M the effect is less pronounced. Drake and Jolly worked at concentrations above 0.35M.

Decreasing the ratio of $NaBH_4$ to $GeO_2$ has an adverse effect on yield, especially at ratios below 4:1. Optimum results were obtained with a ratio of approximately 6:1.

Table V summarizes the conditions favoring the optimum yield of germane using the method of the present invention for acid concentration, base concentration, $GeO_2$ concentration, $BH_4$ concentration, $BH_4^-/GeO$ ratio, and temperature.

TABLE V

| | Present Optimum Reaction Conditions | | | | | | |
|---|---|---|---|---|---|---|---|
| | Acid Conc. M | Base Conc. wt % | $GeO_2$ Conc. M | $BH_4^-$ Conc. M | Ratio $BH_4/GeO_2$ | Temp. °C. | Yield $GeH_4$ |
| BR-02-30 | 1.5 | 2.8 | .13 | .79 | 6.0 | 25 | 97 |
| RJ-01-84 | 3.0 | 2.8 | .13 | .79 | 6.0 | 25 | 96 |

Optimum yields of monogermane are obtained with an acid concentration in a range of 1.5 to 3.0M, a base concentration of approximately 2.8%, a $GeO_2$ concentration of approximately 0.13M, a $BH_4^-$ concentration of approximately 0.79M, a $BH_4^-/GeO_2$ ratio of approximately 6.0, and a temperature of approximately 25° C.

The ratio of germane to digermane can be varied using the herein contemplated process as shown in Table VI.

TABLE VI

| | Variations in Yield of Digermane | | | | |
|---|---|---|---|---|---|
| | Yield Digermane | Mole Ratio $GeO_2:NaBH_4$ | $H_2SO_4$ Conc. | Temp. in. °C. | GeO Sol. Conc. |
| BR-02-53 | 20% | 1:7 | 3 M | 30–40 (heated) | .13 M |
| RJ-02-10 | 1.5% | 1:5 | 3 M | 19–37 | .13 M |
| RJ-02-12 | 1.95% | 1:4 | 3 M | 19–36 | .13 M |
| BR-02-60 | 2.4% | 1:4 | 1.5 M | 20–30 | .13 M |
| RJ-02-23 | 1.2% | 1:4 | 1.5 M | 30–40 (heated) | .13 M |
| BR-03-38 | 4.8% | 1:7 | 1.5 M | 20–30 | .05 M |

The optimum yield of digermane ($Ge_2H_8$) is obtained with a 7:1 mole ratio by heating the reactants. The 20% optimum yield of digermane contrasts with a 8.9% yield reported by Drake and Jolly.

While the invention has been described with respect to certain exemplifications and embodiments thereof, it is not intended to limit the scope of protection thereby, but solely by the claims appended hereto.

I claim:
1. A method of synthesizing gaseous germanium tetrahydride from germanium dioxide starting material to achieve at least about a 78% yield of germanium tetrahydride on the basis of the germanium dioxide starting material, comprising:
   (a) forming a first solution of the germanium dioxide starting material and alkali metal hydroxide, said germanium dioxide present at a molar concentration of less than 0.26 and said alkali metal hydroxide present at a molar ratio of germanium hydroxide to alkali metal hydroxide of less than about 1:2;
   (b) adding an alkali metal borohydride to said first solution at a molar ratio of $BH_4$ to germanium dioxide of greater than 4:1 to form a second solution;

(c) reacting said second solution with $H_2SO_4$, while in the temperature range from about 19° C. to 40° C. to form gaseous germanium tetrahydride of at least about 78% yield on the basis of said germanium dioxide starting material.

2. The method of claim 1, comprising forming the gaseous product containing germane by a batch process.

3. The method of claim 1, comprising forming the gaseous product containing germane by a continuous process.

4. The method of claim 1, comprising forming the gaseous product containing germane under ambient temperature conditions.

5. The method of claim 1, whereby the acid further comprises 1.5 to 3.0M sulfuric acid.

6. The method of claim 1 wherein the aqueous, alkaline first solution comprises 0.11 to 0.15M germanium hydroxide in 0.3 to 0.6M alkali metal hydroxide, and the second solution comprises 0.33 to 1.05 molar concentration borohydride.

7. The method of claim 1 wherein the yield of germane is at least about 82% on the basis of germanium dioxide starting material.

8. The method of claim 1 wherein the yield of germane is at least about 88% on the basis of the germanium dioxide starting material.

9. The method of claim 1 wherein the yield of germane is at least about 96% on the basis of the germanium dioxide starting material.

* * * * *

UNITED STATES PATENT AND TRADEMARK OFFICE
CERTIFICATE OF CORRECTION

PATENT NO. : 4,668,502
DATED : May 26, 1987
INVENTOR(S) : Robert Russotti

It is certified that error appears in the above-identified patent and that said Letters Patent is hereby corrected as shown below:

In the Abstract, line 7, delete "alkalai" and insert therefor --alkali--.

In column 1, line 16, delete "hetertofore" and insert therefor --heretofore--.

In column 2, line 6, delete "germdane" and insert therefor --germane--.

In column 2, line 10, delete "sullfuric" and insert therefor --sulfuric--.

In column 2, line 44, delete "consistant" and insert therefor --consistent--.

In column 7, line 22, before "the" first occurrence, insert --of--.

In column 7, line 29, delete "relatively" and insert therefor --re¹

Signed and Sealed this

Twenty-second Day of December, 1987

*Attest:*

DONALD J. QUIGG

*Attesting Officer*      *Commissioner of Patents and Trademarks*